(12) United States Patent
Christy et al.

(10) Patent No.: US 8,939,329 B2
(45) Date of Patent: Jan. 27, 2015

(54) SEWAGE SILO WITH CENTRIPETAL ACTION DISCHARGE ARM

(75) Inventors: Richard W. Christy, Eagleville, PA (US); Michael Quici, Ambler, PA (US)

(73) Assignee: RDP Technologies, Inc., Conshohocken, PA (US)

( * ) Notice: Subject to any disclaimer, the term of this patent is extended or adjusted under 35 U.S.C. 154(b) by 262 days.

(21) Appl. No.: 13/152,381

(22) Filed: Jun. 3, 2011

(65) Prior Publication Data

US 2012/0308349 A1    Dec. 6, 2012

(51) Int. Cl.
| | | |
|---|---|---|
| G01F 11/20 | (2006.01) | |
| B01D 21/18 | (2006.01) | |
| C02F 1/38 | (2006.01) | |
| C02F 11/00 | (2006.01) | |
| C02F 3/22 | (2006.01) | |
| B65D 88/28 | (2006.01) | |
| B65D 88/54 | (2006.01) | |

(52) U.S. Cl.
CPC . B01D 21/18 (2013.01); C02F 1/38 (2013.01); C02F 11/00 (2013.01); C02F 3/226 (2013.01); B65D 88/28 (2013.01); B65D 88/546 (2013.01)
USPC ............. 222/411; 222/64; 222/226; 222/410; 52/223.3

(58) Field of Classification Search
CPC .... B65G 65/425; B65G 65/466; B65G 65/44; B65D 88/72
USPC ........... 222/64, 411, 410, 226, 236, 239, 240; 52/223.3, 223.5
See application file for complete search history.

(56) References Cited

U.S. PATENT DOCUMENTS

| | | | | |
|---|---|---|---|---|
| 487,720 | A | * | 12/1892 | Crane .......................... 222/282 |
| 3,067,591 | A | * | 12/1962 | Lingle ............................ 62/344 |
| 4,064,744 | A | | 12/1977 | Kistler |
| 4,166,997 | A | * | 9/1979 | Kistler ............................. 338/5 |
| 4,236,852 | A | * | 12/1980 | Krauss .......................... 406/90 |
| 4,264,258 | A | * | 4/1981 | Klinge ......................... 414/309 |
| 4,451,192 | A | * | 5/1984 | Wood .......................... 414/306 |
| 4,454,770 | A | | 6/1984 | Kistler |
| 4,470,522 | A | * | 9/1984 | Lents et al. ................... 222/109 |
| 4,796,747 | A | * | 1/1989 | Kajiwara ..................... 198/535 |
| 5,013,458 | A | | 5/1991 | Christy, Sr. et al. |
| 5,186,840 | A | | 2/1993 | Christy et al. |
| 5,229,011 | A | | 7/1993 | Christy, Sr. et al. |
| 5,313,022 | A | | 5/1994 | Piroozmandi et al. |

(Continued)

OTHER PUBLICATIONS

Hindon Roplex Discharger article (5 pages).

*Primary Examiner* — Paul R Durand
*Assistant Examiner* — Jeremy W Carroll
(74) *Attorney, Agent, or Firm* — Paul & Paul

(57) ABSTRACT

A sewage sludge silo is provided, having a central discharge arm for discharging sludge via a central discharge opening, by means of the discharge arm sweeping across a preferably sloped silo floor, with the discharge arm having upper and lower ends, with the lower end extending forward of the upper end in transverse generally vertical cross-section, as the discharge arm moves in a forward direction across the silo floor. The silo floor can be of multi-layer construction, with one of the layers being molded to facilitate a sloped configuration for the silo floor. The movement of a silo discharge arm can be computer controlled to adjust the speed of the discharge arm to maintain a predetermined or substantially constant rate of discharge of sludge from the silo, with such control being facilitated by appropriate sensor mechanisms.

25 Claims, 4 Drawing Sheets

(56) References Cited

U.S. PATENT DOCUMENTS

| | | |
|---|---|---|
| 5,346,616 A | 9/1994 | Christy, Sr. et al. |
| 5,401,402 A | 3/1995 | Christy et al. |
| 5,405,536 A | 4/1995 | Christy |
| 5,433,844 A | 7/1995 | Christy |
| 5,554,279 A | 9/1996 | Christy |
| 5,618,442 A | 4/1997 | Christy |
| 5,622,467 A * | 4/1997 | Pethullis ............ 414/304 |
| 5,681,481 A | 10/1997 | Christy et al. |
| 5,770,823 A | 6/1998 | Piroozmandi |
| 5,783,073 A | 7/1998 | Christy et al. |
| 5,851,404 A | 12/1998 | Christy et al. |
| 6,447,674 B1 * | 9/2002 | Simon et al. .......... 210/104 |
| 6,698,766 B2 | 3/2004 | Simon |
| 7,416,673 B2 | 8/2008 | Christy et al. |
| 7,669,348 B2 | 3/2010 | Christy et al. |

* cited by examiner

US 8,939,329 B2

SEWAGE SILO WITH CENTRIPETAL ACTION DISCHARGE ARM

BACKGROUND OF THE INVENTION

The present invention is directed to a method and apparatus for the automated discharge of treated sewage sludge from bins, as part of a sludge handling system.

In the treatment of sewage sludge so that it can meet the various criteria of the U.S. Environmental Protection Agency, so that the sewage sludge can be returned to the earth as fertilizer, or in some cases be used as ground fill, it has become commonplace that the sludge is first treated to remove pathogens, or at least reduce the pathogens in the sludge to an EPA acceptable level and to reduce the attractiveness of the sludge to vectors such as rats, mice, flies, etc., as well as to reduce the odors that may otherwise emanate from the sludge. The sludge generally has both solid and liquid components. Often, the sludge is dewatered to produce a higher solids content. The solids content of the sludge can vary, such that the physical characteristics of the sludge can range from a viscous, colloidal liquid to a dry cake or clay-like texture.

Some of the methods and apparatus for treating sludge, to which the present invention is addressed include the following patents, all of which are herein incorporated by reference:

| | |
|---|---|
| 5,013,458 | 5,186,840 |
| 5,229,011 | 5,346,616 |
| 5,401,402 | 5,405,536 |
| 5,433,844 | 5,554,279 |
| 5,618,442 | 5,681,481 |
| 5,783,073 | 5,851,404 |
| 7,669,348 | 7,416,673 |

In accordance with the present invention, dewatered sludge is delivered to a conveyor device that can be any of various types, such as a belt conveyor, a screw conveyor, a pump for pumping sludge through a duct or tube, or any other conveyor devices that supplies sludge to a gravity flow bin. Preferably, a plurality of conveying devices are used, each supplying sludge to a different gravity flow bin. One such apparatus for delivering dewatered sludge to a conveyor mechanism for, in turn, delivering sludge to one or more gravity flow bins, is disclosed in U.S. Pat. No. 6,447,674, the complete disclosure of which is herein incorporated by reference.

It is known to use an arcuately configured discharge arm, sweeping across the floor of the silo or bin, to engage the sludge in the silo and move it toward the central discharge opening.

THE PRESENT INVENTION

In accordance with this invention the discharge arm has a lower end that extends forward of its upper end as the discharge arm rotates in a forward direction, so that sludge that is engaged is plowed forwardly, as it is being scooped radially inwardly toward a central discharge opening.

Another feature of this invention is that the discharge arm, substantially throughout its length, can be comprised of a plurality of components; one being the base component of the arm, and the other being a forward surface that is replaceable and that may have any of a plurality of desired plow-like shapes, with different replaceable surfaces being attachable to the base arm component, as desired.

Another feature of this invention is that the discharge arm can be driven at variable speeds, such that the speed of the discharge arm can automatically adjust to maintain a constant rate of discharge of sludge from the silo.

Another feature of the invention is that the speed of the discharge arm can be modified, automatically by one or more of various sensing means, preferably acting through a programmable logic computer to control the variable speed drive of the discharge arm.

Another feature of this invention is that the floor of the silo can be slightly sloped upward from the central discharge opening toward the silo wall.

Another feature of this invention is that the silo floor can be comprised of a plurality of layers, one of which would be a base plate, another of which would be an intermediate molded layer and yet another layer could be a thin top plate on top of the molded layer.

Another feature of this invention is that, with the silo having a slightly sloped floor, the sludge that is contacted by the discharge arm is directed radially inwardly toward the central discharge opening due to centripetal force plus a gravitational force that depends upon the amount of slope of the silo floor, in addition to an arcuate force in the forward direction.

Other objects and advantages of the present invention will be readily apparent upon a reading of the following brief descriptions of the drawing figures, the detailed descriptions of the preferred embodiments, and the appended claims.

BRIEF DESCRIPTIONS OF THE DRAWING FIGURES

FIG. 1 is a schematic, generally vertical section through a sewage silo or bin, with the silo being mounted on a supporting floor of a building, via load cells that are operationally connected to a computer, with another sensing device inside the upper end of the silo or bin, and with a rotationally driven discharge arm disposed for sweeping across the floor of the silo for engaging sludge therein and moving the same toward a central discharge opening.

DETAILED DESCRIPTIONS OF THE PREFERRED EMBODIMENTS

Figure 1:
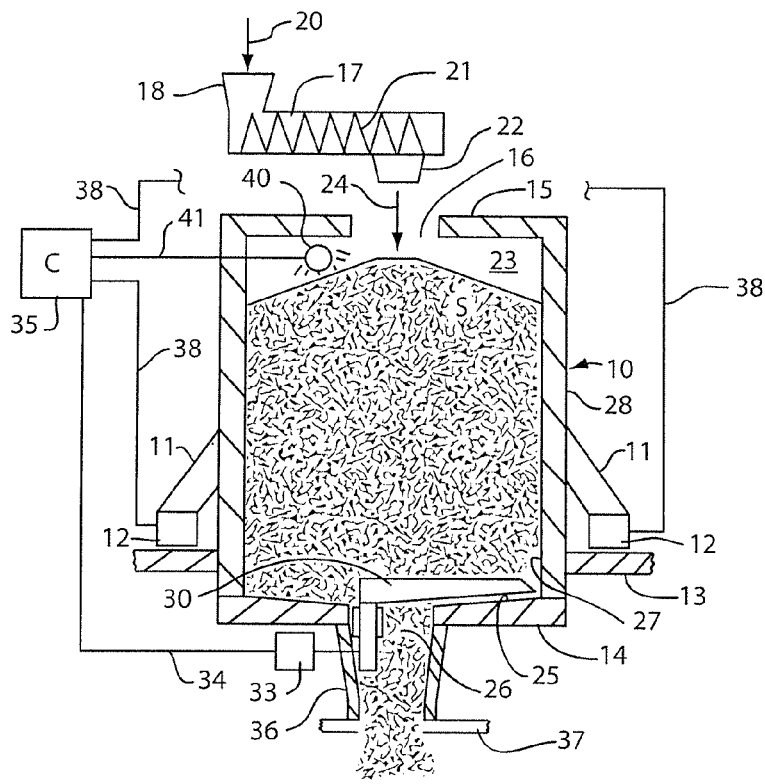

Referring now to FIG. 1, there is illustrated a silo 10, in accordance with this invention, carried by support legs 11 that, in turn, are mounted on load cells 12. The load cells 12 are mounted on and carried by a structural floor 13, for example, of a building or other structural supporting floor.

The silo or bin 10 has a silo floor 14 at the bottom thereof, and the silo itself is generally cylindrical in construction, and having an upper end 15, with an inlet opening 16 generally centrally thereof.

Above the silo 10, a conveyor apparatus 17 is adapted to receive biosolids sludge delivered to its inlet 18 in the direction of the arrow 20. An auger 21 disposed within the conveyor device 17 delivers sludge via its outlet 22, into the interior 23 of the silo, as indicated by the arrow 24.

The floor 14 of the silo has an upper surface 25 that is preferably sloped from a silo floor central discharge 26, upwardly, toward the lower end of the inner surface 27 of the silo wall 28.

A discharge arm is mounted at the bottom of the silo 10, for sweeping across the floor 25 of the silo, engaging sludge at the bottom of the silo 10, and moving the sludge to exit the silo 10 via the central discharge opening 26.

The discharge arm 30 is carried by a suitable vertical support 31 that, in turn, is mounted for rotation in a suitable bearing structure 32 carried by the silo floor 14, for rotation of the support 31 and the discharge arm 30 carried therein.

The vertical support 31 is driven via a drive mechanism 32, which, in turn, is driven by a variable speed motor 33 controlled by a control line 34 from a programmable logic computer 35.

The load cells 12 may be constructed as are the load cells in U.S. Pat. No. 7,669,348, or any one or more of U.S. Pat. Nos. 5,770,823; 4,064,744; 4,166,997; 4,454,770 and 5,313,022, the complete disclosures of which are herein incorporated by reference.

The load cells 12 provide the computer 35 with information as to the weight of the silo with which the load cells are associated, together with the weight of the biosolids sludge in the silo. Because the weight of the silo itself is a known, predetermined quantity, and because the computer 35 is programmed to subtract the weight of the silo with which the load cells 12 are associated, the computer can readily determine the weight of the sludge in the silo 10. Thus, the load cells 12 can effectively sense the rate of discharge of sludge from the silo and adjust the speed of the discharge arm 30 via the variable speed motor 33, through control line 34, in order to maintain a predetermined rate or rates, calculated to be most effective for the initial, high capacity and/or final loading phases of filling the trucks disposed therebeneath. In some cases, that rate may be a substantially constant rate of discharge of sludge S from the silo 10.

Beneath the central discharge opening 26 of the silo floor 14, there is provided a discharge chute 36, through which sludge passes.

At the bottom of the discharge chute, which is generally frusto-conical in configuration, there is provided an openable gate 37, which can be opened, either manually, or by the computer 35, by any suitable control line and electrical or hydraulic or pneumatic opening mechanism (not shown), for allowing sludge S delivered via the central discharge opening 26, by the discharge arm 30, to pass through the chute 36 when the gate 37 is in its open position, for delivery of sludge to a truck or the like disposed therebeneath (not shown).

The gate 37 may be made in accordance with U.S. Pat. No. 6,698,766, or of any alternate construction. The complete disclosure of U.S. Pat. No. 6,698,766 is herein incorporated by reference.

It will be apparent that the load cells 12 communicate with the computer 35 via suitable control lines 38.

One or more sensors 40 may be located inside the silo 10, at the upper end thereof, for detecting the height of sludge S in the silo 10, and communicating that to the computer 35 via control line 41, and thus the sensor 40 can effectively sense the rate of discharge of sludge from the silo, by continually sensing the height of sludge in the silo, and can thus communicate with the computer 35, to enable the computer 35 to adjust the speed of the discharge arm 30 via the variable speed drive motor 33, through control line 34.

Thus, either or both of the load cells 12 and sensor 40 can be used to maintain a constant rate of discharge sludge S through the central discharge opening 26.

Figure 2:
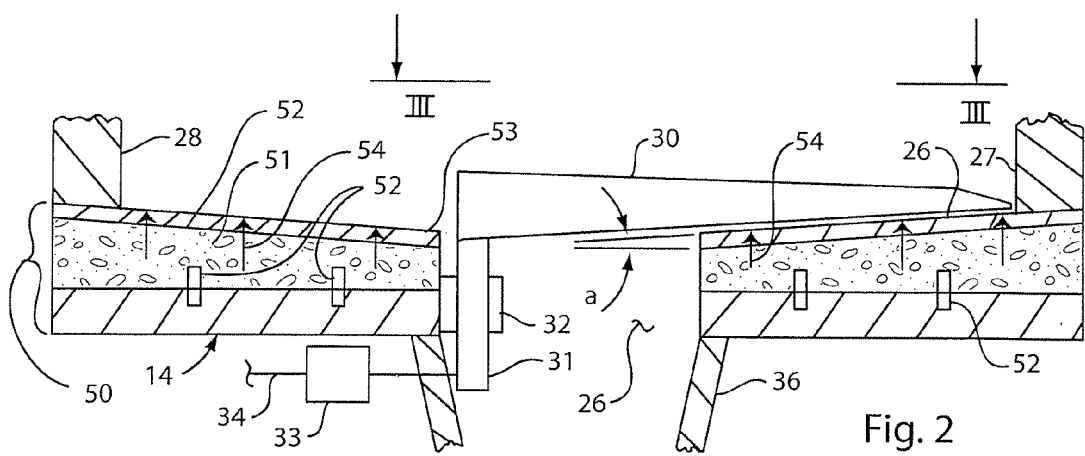
FIG. 2 is an enlarged fragmentary vertical sectional view of the bottom of the silo of FIG. 1 and its discharge arm, with the section of FIG. 2 being taken along the line II-II of FIG. 3.

With reference to FIG. 2, the structure of the silo floor 14 is more clearly illustrated. The silo floor 14 may be comprised of multiple layers. For example, it can comprise a base layer 50 of for example a steel plate of substantial thickness, for supporting the weight of sludge S in the silo 10. Above the plate 50, there may be molded a concrete floor layer 51, secured to the plate 50 by a plurality of anchors 52, with the anchors 52 being carried by the base plate 50 and projecting upwardly, such that the layer 51 is molded around the anchors 52 when the layer 51 is poured in place. The layer 51, while preferably being constructed of concrete or the like, may alternatively be comprised of a suitable molded plastic or resin, as may be desired, or any other material.

The molded layer 51 is molded with a sloped upper surface 52, as shown.

Above the layer 51, and disposed thereagainst is a top plate 53, preferably of steel or other suitable metal construction, which top plate 53 is relatively thin, compared with the base plate 50. The top plate 53 may be secured to the molded layer 51 by means of suitable anchor bolts 54, anchoring the top plate 53 to the molded layer 51.

A construction of the floor 14 of the silo 10 in this manner, allows for an economic construction of the floor 14.

However the floor 14 is constructed, its upper surface 26 is disposed at a slope "a" as shown in FIG. 2, which slope is upwardly from the central discharge opening 26, to the inner surface 27 of the silo wall 28.

The slope "a" of the upper surface 26 of the silo floor 14 is selected to be within the range of ½° to 47°, more preferably within the range of ½° to 15° and most preferably within the range of ½° to 8.5°, in order to facilitate centripetal and gravity forces assisting movement of sludge that is engaged by the silo discharge arm 30, toward the central discharge opening 26.

Figure 3:
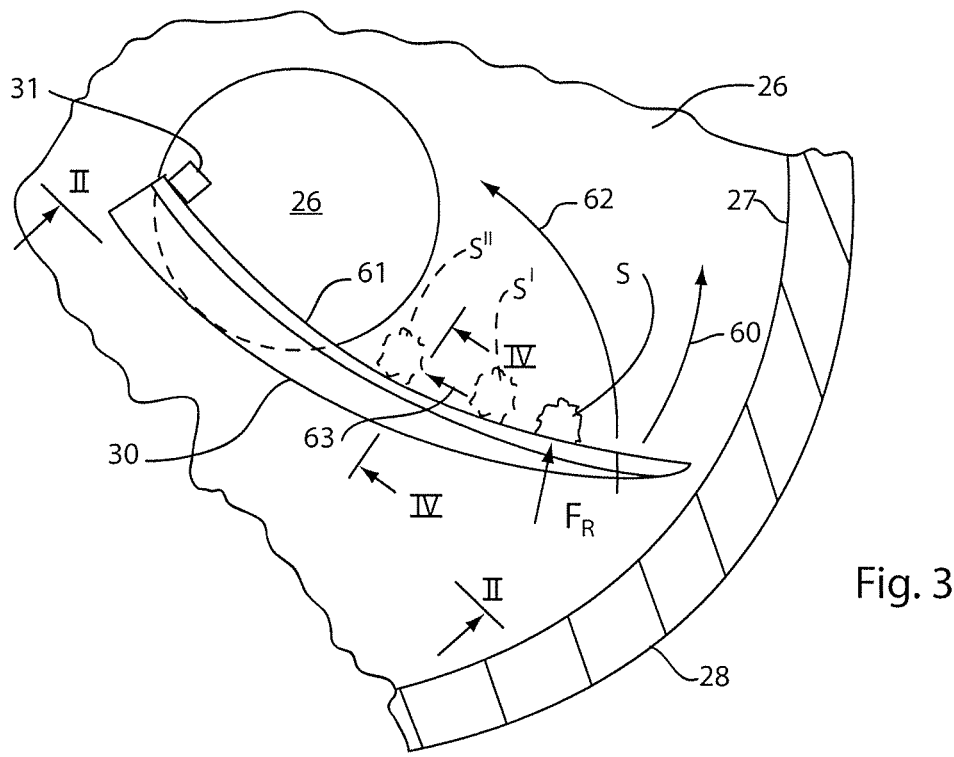
FIG. 3 is an enlarged fragmentary horizontal sectional view through the wall of the silo of FIG. 2, taken generally along the line of FIG. 2, wherein the forward arcuate movement of the discharge arm is illustrated.

With reference now to FIG. 3, it will be seen that the silo discharge arm 30 carried by its vertical support 31 is adapted for movement along the upper sloped surface 26 of the silo floor 14, in the direction of the arrow 60, which direction is considered the forward direction of motion of the discharge arm 30 and of sludge S engaged thereby.

The discharge arm 30, it will be seen, as viewed in FIG. 3, as having a forward surface 61 that is arcuately configured, generally rake-like, to engage sludge S, and move the same forwardly with an applied force $F_R$, sweeping the same in the general direction of the arrow 62, as the discharge arm 61 moves as shown by the arrow 60.

Figure 6:
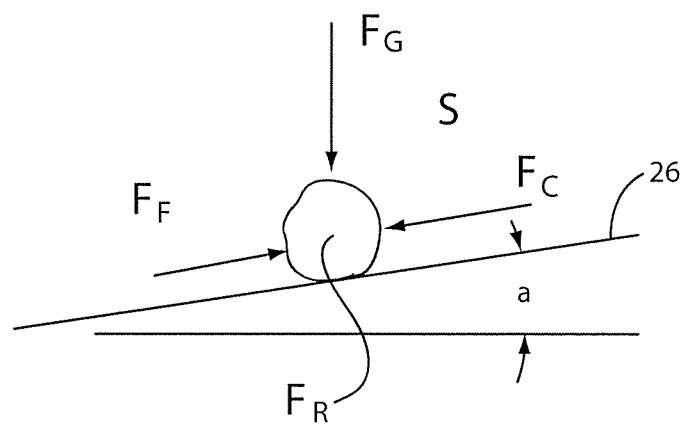
FIG. 6 is a schematic illustration of forces acting on sewage sludge that would be applied via a discharge arm, when the floor of the silo is sloped.

With reference also to FIG. 6, it will be seen that the sludge particle S, in addition to being subjected to the force $F_R$, it is also subjected to a force $F_C$ which is a centripetal force due to the slope of the floor 26 an amount "a" at the angle "a" indicated. Because the floor 26 is thus sloped, there will be a gravitational component of force $F_G$ in a downward direction, also urging the sludge S to have a somewhat leftward direction as shown in FIG. 6, depending on the degree of slope of the floor 26. Resisting these forces $F_C$ $F_G$ in the direction toward the central discharge opening 26, is a frictional component of force $F_F$, in a contrary direction as shown. The net effect of these forces is substantially in a radial inward direction. With reference to FIG. 3, the sludge S thus moves leftward, as shown for the positions S' and S" as the sludge moves radially inwardly as shown by the arrow 63, sliding along the surface 61 of the discharge arm 30, to create a laminar flow of sludge along the face surface 61 of the discharge arm 30. Such sliding of sludge S along the surface 61 of the discharge arm 30, facilitates a continual cleaning of the surface 61, preventing sludge build-up.

The discharge arm 30 may be comprised of a plurality of components.

Figure 4:
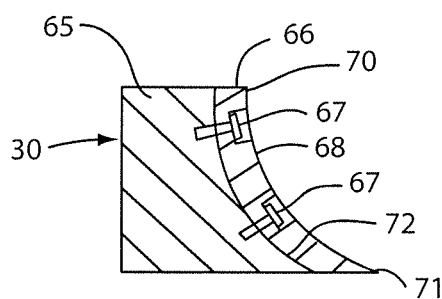
FIGS. 4, 4A and 4B are vertical sectional views taken through the discharge arm illustrated in FIG. 3, generally along the line IV-IV of FIG. 3, illustrating alternative configurations for the composite multi-component discharge arm of FIG. 3.

With reference to FIG. 4, the discharge arm 30 will be seen to be comprised of a main arm component 65 and a removable and replaceable forward arm component 66, with the forward arm component 66 being mounted to the main arm component 65 by suitable fasteners 67 having their heads countersunk in the forward surface 68 of the replaceable component 66, and with their shanks in fastening engagement with the main arm component 65, as shown.

The forward surface 68 of the discharge arm 30, will be seen in FIG. 4 to be arcuately configured in a plow-like shape between its upper end 70 and its lower end 71 as shown in transverse, generally vertical cross-section.

The lower end 71 of the discharge arm is shown in FIG. 4 to be more forward of the upper end 70, and to have an arcuately configured forward surface 68, facilitating the plow-like construction.

The forward surface 72 of the main arm component 65, in the embodiment of FIG. 4, is shown to have a complemental configuration to the surface 68, as shown.

Figure 4A:
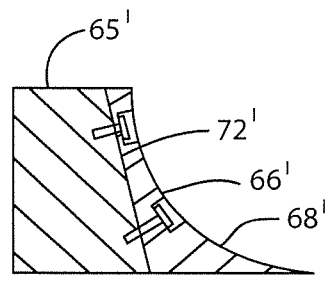

With reference to FIG. 4A, an alternative configuration for the discharge arm 30 is shown, whereby its main arm component 65' has a forward surface 72' that is generally flat, and whereby the replaceable component 66' has a correspondingly flat left surface, as shown, and an arcuate forward surface 68', like the embodiment of FIG. 4.

Figure 4B:
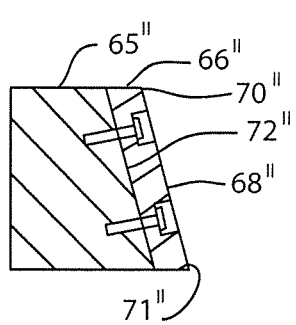

In the embodiment of FIG. 4B, the main arm component 65" of the discharge arm has a flat forward surface 72", and the rear surface of the replaceable arm component 66" is likewise flat and complemental with surface 72", with the replaceable component 66" having a forward surface 68" that is likewise flat, yet having a lower end 71" that is forward of the upper end 70" of the discharge arm, as shown.

Figure 5:
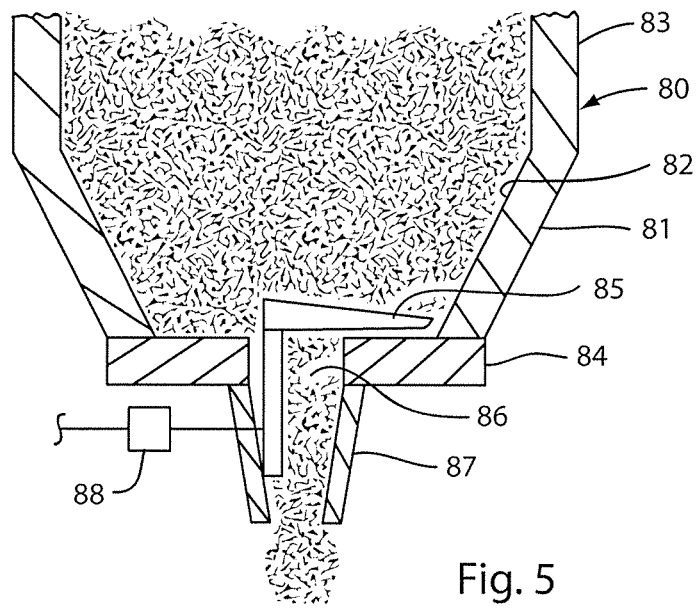
FIG. 5 is a fragmentary vertical sectional view taken through a sewage silo of this invention, having an alternative configuration for its lower end, that is tapered, as distinguished from the straight cylindrical silo wall configuration illustrated in FIG. 1.

With reference to FIG. 5, an alternative embodiment for the silo is illustrated, wherein the silo 80 is shown to have a frusto-conically configured lower end 81, giving a tapered configuration 82 to the inner surface thereof. Above the lower end 81 the silo wall 83 is generally cylindrical, as is the silo wall 28 for the embodiment of FIG. 1. The silo floor 84 for the silo 80 is constructed as described above with respect to the silo floor for the embodiment of FIGS. 1 and 2, as is the discharge arm 85 and its drive mechanism and controls. Likewise, the silo 80 has a central discharge opening 86, a discharge chute 87, a driven variable speed motor 88, all similar to those described for the embodiment of FIGS. 1 and 2 above. In all respects other than the frusto-conical configuration for the lower end 81 of the silo 80, the silo 80 of FIG. 5 as well as its structural features for discharging sludge therethrough is as described above with respect to the embodiments of FIGS. 1-4, 4A, 4B and 6.

Figure 7:
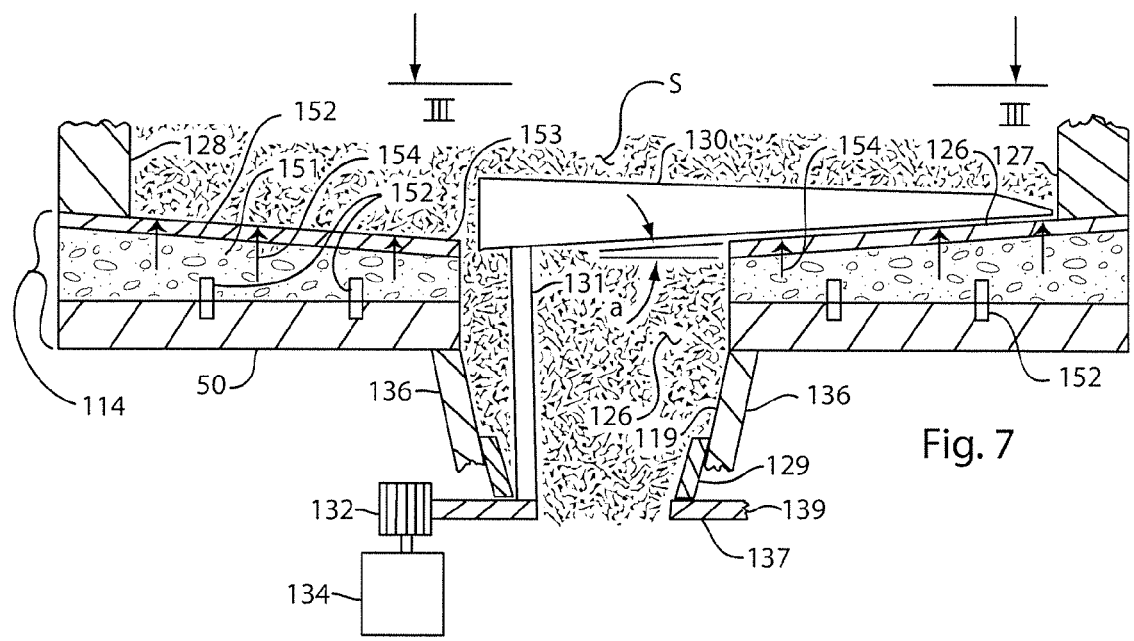
FIG. 7 is an illustration like that of FIG. 2, but wherein an alternative discharge structure embodying a rotating seal, is provided.

With reference to FIG. 7, the structure of the silo floor 114 for an alternative sludge discharge with a rotating seal is illustrated. The silo floor 114 may likewise be comprised of multiple layers. For example, it can comprise a base layer 150 of for example a steel plate of substantial thickness, for supporting the weight of sludge S in the silo 10. Above the plate 150, there may be molded a concrete floor layer 151, secured to the plate 150 by a plurality of anchors 152, with the anchors 152 being carried by the base plate 150 and projecting upwardly, such that the layer 151 is molded around the anchors 152 when the layer 151 is poured in place. The layer 151, while preferably being constructed of concrete or the like, may alternatively be comprised of a suitable molded plastic or resin, as may be desired, or any other material.

The molded layer 151 is molded with a sloped upper surface 152, as shown, as with them embodiment of FIG. 2.

Above the layer 151, and disposed thereagainst is a top plate 153, preferably of steel or other suitable metal construction, which top plate 153 is relatively thin, compared with the base plate 150. The top plate 153 may be secured to the molded layer 151 by means of suitable anchor bolts 154, anchoring the top plate 153 to the molded layer 151.

A construction of the floor 114 of the silo 10 in this manner, allows for an economic construction of the floor 114.

However the floor 114 is constructed, its upper surface 126 is disposed at a slope "a" as is also shown in FIG. 2, which slope is upwardly from the central discharge opening 126, to the inner surface 27 of the silo wall 128.

A table 137 is provided with a suitable means for being rotated, such as by having gear teeth (not shown) at its periphery 139, which peripheral teeth can be engaged by a spur gear 136 driven by a suitable fixed speed or variable speed motor 134. A seal 129 is likewise mounted to and carried by the table 137, and can slideably engage the frusto-conical interior 119 of the discharge chute 136, as the table 137 rotates, with the weight of the sewage sludge S facilitating the pressing of the seal 129 against the interior 119 of the discharge chute 136. The seal 129 is thus a peripheral seal and operates in sliding engagement against the surface 119 at the bottom of the silo 10. An openable gate (not shown) like that 37 of FIG. 1 may be provided beneath the table 137.

The slope "a" of the upper surface 126 of the silo floor 114 is likewise selected to be within the range of ½° to 47°, more preferably within the range of ½° to 15° and most preferably within the range of ½° to 8.5°, in order to facilitate centripetal and gravity forces assisting movement of sludge that is engaged by the silo discharge arm 130, toward the central discharge opening 126.

It will be apparent from the foregoing that various modifications may be made in the details of construction, as well as in the use and operation of the apparatus of this invention, all within the spirit and scope of the invention as defined by the appended claims.

What is claimed is:

1. A sewage sludge silo for handling sewage sludge that has a sufficiently high solids content that it has a consistency of a dry cake-like or clay-like texture, the silo having a sidewall, at least a substantial portion of which is generally cylindrical, and a silo floor at the bottom thereof; with a central discharge opening in the silo floor for discharge of sludge therethrough; with the silo being mounted on a structural floor; a rotatable discharge arm adjacent the silo floor and extending radially throughout the length of the discharge arm from the central discharge opening toward the silo wall, with a lower end of the discharge arm being generally parallel to the silo floor; the discharge arm being supportably mounted on an arm support extending from a generally radially inner end of the discharge arm through the central discharge opening; with a generally radially outermost end of a discharge arm being adjacent the silo wall; drive means for rotatably driving the discharge arm in a sweeping forward motion across the silo floor and for enabling the discharge arm to engage the dry cake-like or clay-like sewage sludge and plow the sewage sludge forwardly across the silo floor; with the discharge arm being of an arcuate rake-like curved configuration in the direction of its forward motion; and with the discharge arm having an upper end and a lower end, with the lower end being adjacent the silo floor; with the lower end of the discharge arm extending forward of the upper end of the discharge arm in transverse generally vertical cross-section of the discharge arm.

2. The silo of claim 1, wherein the discharge arm is arcuately configured in a plow-like shape between its upper end and its lower end in transverse generally vertical cross-section of the discharge arm.

3. The silo of claim 2, wherein the discharge arm is comprised of a main radially disposed arm component and a separate, replaceable forward radially disposed arm component carried by the main arm component substantially throughout the length of the discharge arm.

4. The silo of claim 1, wherein the discharge arm is angularly configured in a plow-like shape between its upper end and lower end in transverse generally vertical cross-section of the discharge arm.

5. The silo of claim 4, wherein the discharge arm is comprised of a main radially disposed arm component and a separate, replaceable forward radially disposed arm component carried by the main arm component substantially throughout the length of the discharge arm.

6. The silo of claim 1, wherein the drive means is a variable speed drive.

7. The silo of claim 6, including a sensor means for sensing the rate of discharge of sludge from the silo and adjusting the speed of the discharge arm via the variable speed drive to maintain a substantially constant rate of discharge of sludge from the silo.

8. The silo of claim 7, wherein the sensing means includes means for sensing the level of sludge in the silo at any given time.

9. The silo of claim 7, wherein the silo is mounted on load cells that measure the weight of the silo with sludge therein, that comprises the sensing means.

10. The silo of claim 7, including a programmable logic computer, and wherein the sensing means is connected to the computer and the computer is connected to the drive means, for controlling the variable speed drive.

11. The silo of claim 1, wherein the silo floor is sloped upward from the central discharge opening toward the silo wall in generally vertical cross-section.

12. The silo of claim 11, wherein the slope is at an angle with the horizontal that is within the range of ½° to 47°.

13. The silo of claim 11, wherein the slope is at an angle with the horizontal that is within the range of ½° to 15°.

14. The silo of claim 11, wherein the slope is at an angle with the horizontal that is within the range of ½° to 8.5°.

15. The silo of claim 11, wherein the discharge arm comprises means for engaging sludge that is contacted by the discharge arm with a centripetal force from the discharge arm, a gravitational force that, in amount, is dependent upon the slope of the silo floor, and an arcuate force in the forward direction.

16. The silo of claim 15, wherein the silo floor comprises means for engaging the sludge with a frictional force resistant to movement of the sludge toward the central discharge opening.

17. The silo of claim 11, wherein the forward surface of the discharge arm and the slope of the silo floor together comprise means for engaging sludge with the discharge arm and moving the sludge in laminar flow along the forward surface of the discharge arm.

18. The silo of claim 1, wherein the silo floor is comprised of a generally flat, substantially uniform thickness bottom plate, an intermediate molded layer on top of the bottom plate, and a thin top plate on top of the molded layer.

19. The silo of claim 18, wherein the intermediate layer includes concrete.

20. The silo of claim 18, wherein the intermediate molded layer is sloped upward from the central discharge opening toward the silo wall in generally vertical cross-section.

21. The silo of claim 18, wherein the silo floor is sloped upward from the central discharge opening toward the silo wall in generally vertical cross-section.

22. The silo of claim 1, wherein the lower end of the silo wall nearest the silo floor is angled toward the central discharge opening in a generally frusto-conical configuration.

23. The silo of claim 1, wherein the silo floor is generally horizontal from the central discharge opening toward the silo wall in generally vertical cross-section.

24. The silo of claim 1, wherein the central discharge opening is provided with a discharge chute having an inner surface, including a rotating peripheral seal separate from and beneath the discharge arm in engagement against the inner surface of the discharge chute; and wherein the drive means for the rotating discharge arm is within the peripheral seal; whereby the discharge arm can rotate within the sludge without leakage or discharge of sludge or any of its liquid components from the silo, other than via the central discharge opening.

25. The silo of claim 1, wherein the discharge arm is arcuately configured in a plow-like shape between its upper end and its lower end in transverse generally vertical cross-section of the discharge arm; wherein the drive means is a variable speed drive; including a sensor means for sensing the rate of discharge of sludge from the silo and adjusting the speed of the discharge arm via the variable speed drive to maintain a substantially constant rate of discharge of sludge from the silo; wherein the silo is mounted on load cells that measure the weight of the silo with sludge therein, that comprises the sensing means; including a programmable logic computer, and wherein the sensing means is connected to the computer and the computer is connected to the drive means, for controlling the variable speed drive; wherein the silo floor is sloped upward from the central discharge opening toward the silo wall in generally vertical cross-section; wherein the silo floor is comprised of a generally flat, substantially uniform thickness bottom plate, an intermediate molded layer on top of the bottom plate, and a thin top plate on top of the molded layer; wherein the forward surface of the discharge arm and the slope of the silo floor together comprise means for engaging sludge with the discharge arm and moving the sludge in laminar flow along the forward surface of the discharge arm and wherein the central discharge opening is provided with a discharge chute having an inner surface, including a rotating peripheral seal in engagement against the inner surface of the discharge chute; and wherein the drive means for the rotating discharge arm is within the peripheral seal separate from and beneath the discharge arm; whereby the discharge arm can rotate within the sludge without leakage or discharge of sludge or any of its liquid components from the silo, other than via the central discharge opening.

\* \* \* \* \*